US012126817B2

(12) United States Patent
Hendry et al.

(10) Patent No.: US 12,126,817 B2
(45) Date of Patent: Oct. 22, 2024

(54) TILE GROUP SIGNALING IN VIDEO CODING

(71) Applicant: Huawei Technologies Co., Ltd., Shenzhen (CN)

(72) Inventors: F N U Hendry, San Diego, CA (US); Ye-Kui Wang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/336,804

(22) Filed: Jun. 16, 2023

(65) Prior Publication Data
US 2023/0336743 A1    Oct. 19, 2023

Related U.S. Application Data

(63) Continuation of application No. 17/670,708, filed on Feb. 14, 2022, now Pat. No. 11,729,401, which is a
(Continued)

(51) Int. Cl.
*H04N 19/172*    (2014.01)
*H04N 19/174*    (2014.01)
(Continued)

(52) U.S. Cl.
CPC ......... *H04N 19/172* (2014.11); *H04N 19/174* (2014.11); *H04N 19/184* (2014.11); *H04N 19/463* (2014.11)

(58) Field of Classification Search
CPC .. H04N 19/172; H04N 19/174; H04N 19/184; H04N 19/463
See application file for complete search history.

(56) References Cited

U.S. PATENT DOCUMENTS 10,136,142 B2 *  11/2018  Maeda ................ H04N 19/105
2015/0195577 A1    7/2015  Hannuksela
(Continued)

FOREIGN PATENT DOCUMENTS

EP    2903267 B1    4/2017
JP    6271888 B2    1/2018

OTHER PUBLICATIONS

JVET-M0130-v1, Wang, Y.K. et al., "On tile grouping," Joint Video Experts Team (JVET) of ITU-T SG 16 WP 3 and ISO/IEC JTC 1/SC 29/WG11, 13th Meeting: Marrakech, MA, Jan. 9-18, 2019, 7 pages. XP030197804.
(Continued)

*Primary Examiner* — Fabio S Lima
(74) *Attorney, Agent, or Firm* — Conley Rose, P.C.

(57) ABSTRACT

A method implemented in an encoder for encoding a video bitstream that includes coded data for a plurality of pictures, each of the plurality of pictures comprises at least one slice. The method includes encoding a flag that indicates whether tile information for a picture is present in a picture parameter set or present in a slice header, where the tile information indicates a location of a slice within the picture; encoding the tile information in only the picture parameter set when the flag indicates that the tile information for the picture is encoded in the picture parameter set; encoding the tile information in only the slice header when the flag indicates that the tile information for the picture is encoded in the slice header; and encoding data of the picture in the video bitstream based on the tile information.

20 Claims, 10 Drawing Sheets

Related U.S. Application Data continuation of application No. 17/229,631, filed on Apr. 13, 2021, now Pat. No. 11,284,092, which is a continuation of application No. PCT/US2019/065909, filed on Dec. 12, 2019.

(60) Provisional application No. 62/871,024, filed on Jul. 5, 2019, provisional application No. 62/785,517, filed on Dec. 27, 2018.

(51) Int. Cl.
*H04N 19/184* (2014.01)
*H04N 19/463* (2014.01)

(56) References Cited

U.S. PATENT DOCUMENTS

| | | | |
|---|---|---|---|
| 2015/0304673 A1* | 10/2015 | Araki | H04N 19/44 382/233 |
| 2015/0334425 A1 | 11/2015 | He et al. | |
| 2017/0134829 A1 | 5/2017 | Kaisha | |
| 2019/0297339 A1* | 9/2019 | Hannuksela | H04N 19/105 |
| 2020/0213604 A1* | 7/2020 | Choi | H04N 21/8455 |

OTHER PUBLICATIONS

Sullivan, et al., "Overview of the High Efficiency Video Coding (HEVC) Standard," IEEE Transactions on Circuits and Systems for Video Technology, vol. 22, No. 10, retrieved from the internet: http://iphone.hhi.de/wiegand/assets/pdfs/2012_12_IEEE-HEVC-Overview, Dec. 12, 2012, pp. 1649-1668.
"Line Transmission of Non-Telephone Signals Video Codec for Audiovisual Services at px64 kbits," ITU-T Recommendation H.261, Mar. 1993, 29 pages.
"Transmission of Non-Telephone Signals; Information Technology—Generic Coding of Moving Pictures and Associated Audio Information: Video," ITU-T Recommendation H.262, Jul. 1995, 211 pages.
"Series H: Audiovisual and Multimedia Systems; Infrastructure of audiovisual services—Coding of moving video; Video coding for low bit rate communication," ITU-T Recommendation H.263, Jan. 2005, 226 pages.
"Series H: Audiovisual and Multimedia Systems; Infrastructure of audiovisual services—Coding of moving video; Advanced video coding for generic audiovisual services," Recommendation ITU-T H.264, Jun. 2019, 836 pages.
"Series H: Audiovisual and Multimedia Systems; Infrastructure of audiovisual services—Coding of moving video; High efficiency video coding" Recommendation ITU-T H.265, Apr. 2013, 317 pages.
JVET-L1001-v5, "Versatile Video Coding (Draft 3)," Joint Video Experts Team (JVET) of ITU-T SG 16 WP 3 and ISO/IEC JTC 1/SC 29/WG 11, 12th Meeting: Macao, CN, Oct. 3-12, 2018, 193 pages.
JCTVC-AC1005-v2, "HEVC Additional Supplemental Enhancement Information (Draft 4)," Joint Collaborative Team on Video Coding (JCT-VC)of ITU-T SG 16 WP 3 and ISO/IEC JTC 1/SC 29/WG 11, 29th Meeting: Macao, CN, Oct. 19-25, 2017, 56 pages.
JVET-L0686-v2, "Spec text for the agreed starting point on slicing and tiling," Joint Video Experts Team (JVET) of ITU-T SG 16 WP 3 and ISO/IEC JTC 1/SC 29/WG 11, 12th Meeting: Macao, CN, Oct. 3-12, 2018, 1 page.
JVET-L0114-v1, "On slicing and tiling in VVC," Joint Video Experts Team (JVET) of ITU-T SG 16 WP 3 and ISO/IEC JTC 1/SC 29/WG 11, 12th Meeting: Macao, CN, Oct. 3-12, 2018, 5 pages.
Document: JVET-K1001-v5, Bross, B., et al, "Versatile Video Coding (Draft 2)," Joint Video Experts Team (JVET) of ITU-T SG 16 WP 3 and ISO/IEC JTC 1/SC 29/WG 11, 11th Meeting: Ljubljana, SI, Jul. 10-18, 2018, 136 pages.

* cited by examiner

TILE GROUP SIGNALING IN VIDEO CODING

CROSS-REFERENCE TO RELATED APPLICATIONS

This application is a continuation of U.S. patent application Ser. No. 17/670,708 filed Feb. 14, 2022, which is a continuation of U.S. patent application Ser. No. 17/229,631 filed Apr. 13, 2021, which is a continuation of International Application No. PCT/US2019/065909 filed on Dec. 12, 2019, which claims the benefit of U.S. Provisional Patent Application No. 62/785,517, filed Dec. 27, 2018, and U.S. Provisional Patent Application No. 62/871,024, filed Jul. 5, 2019, each of which is hereby incorporated by reference.

TECHNICAL FIELD

The present disclosure is generally related to video coding, and is specifically related to tile group signaling in video coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

A first aspect of the disclosure includes a method implemented in an encoder, the method comprising: encoding, by a processor of the encoder, a flag that specifies whether tile information for a coded picture is present in a parameter set or in a tile group header, wherein the tile information indicates which tiles of the picture are included in a tile group; encoding, by the processor, the tile information in only the parameter set in response to a determination that the flag specifies that the tile information for a coded picture is encoded in the parameter set; encoding, by the processor, the tile information in only the tile group header in response to a determination that the flag specifies that the tile information for a coded picture is encoded in the tile group header; encoding, by the processor, the picture in the video bitstream based on the tile information; and transmitting the video bitstream along a network towards a decoder. The present aspect provides a mechanism to improve tile group structure signaling and reduce redundant information.

Optionally, in the first aspect, wherein encoding, by the processor, the tile information in only the parameter set comprises encoding, by the processor, a tile identifier (ID) of a first tile of each tile group in the picture.

Optionally, in the first aspect, wherein encoding, by the processor, the tile information in only the parameter set further comprises: parsing, by the processor, a second flag that specifies whether a current tile group that refers to the parameter set comprises more than one tile; and encoding, by the processor, a tile ID of a last tile of the current tile group in the picture in response to a determination that the second flag specifies that the current tile group that refers to the parameter set comprises more than one tile.

Optionally, in the first aspect, wherein encoding, by the processor, the tile information in only the parameter set further comprises: parsing, by the processor, a second flag that specifies whether a current tile group that refers to the parameter set comprises more than one tile; and encoding, by the processor, a number of tiles in the current tile group in the picture in response to a determination that the second flag specifying that the current tile group that refers to the parameter set comprises more than one tile.

Optionally, in the first aspect, wherein encoding, by the processor, the tile information in only the tile group header comprises: encoding, by the processor, a tile ID of a first tile of a tile group in the picture in a tile group header; determining, by the processor, whether the flag specifies that the tile information for the coded picture is encoded in the tile group header and whether the second flag specifies that a current tile group that refers to the parameter set comprises more than one tile; and encoding, by the processor, a tile ID of a last tile of the tile group in the picture in the tile group header in response to a determination that the flag specifies that the tile information for the coded picture is encoded in the tile group header and that the second flag specifies that the current tile group that refers to the parameter set comprises more than one tile.

A second aspect of the disclosure includes a method implemented in a decoder for decoding a video bitstream, wherein the bitstream comprises coded data for at least one picture, each picture comprises at least one tile group, the method comprises: parsing, by a processor of the decoding, a flag that specifies whether tile information for a coded picture is present in a parameter set or in a tile group header, wherein the tile information indicates which tiles of the picture are included in a tile group; parsing, by the processor, the tile information from the parameter set in response to a determination that the flag specifies that the tile information for a coded picture is encoded in the parameter set; parsing, by the processor, the tile information from the tile group header in response to a determination that the flag specifies that the tile information for a coded picture is encoded in the tile group header; and obtaining the decoded data of the coded picture based on the tile information.

Optionally, in the second aspect, wherein parsing, by the processor, the tile information in the parameter set comprises decoding a tile identifier (ID) of a first tile of each tile group in the picture.

Optionally, in the second aspect, wherein parsing, by the processor, the tile information in the parameter set further comprises: parsing, by the processor, a second flag that specifies whether a current tile group that refers to the parameter set comprises more than one tile; and decoding a tile ID of a last tile of the current tile group in the picture in response to a determination that the second flag specifies that the current tile group that refers to the parameter set comprises more than one tile.

Optionally, in the second aspect, wherein parsing, by the processor, the tile information in the parameter set further comprises: parsing, by the processor, a second flag that specifies whether a current tile group that refers to the parameter set comprises more than one tile; and decoding a number of tiles in the current tile group in the picture in response to a determination that the second flag specifying that the current tile group that refers to the parameter set comprises more than one tile.

Optionally, in the second aspect, wherein parsing, by the processor, the tile information in the tile group header comprises: decoding a tile ID of a first tile of a tile group in the picture in a tile group header; determining whether the flag specifies that the tile information for the coded picture is encoded in the tile group header and whether the second flag specifies that a current tile group that refers to the parameter set comprises more than one tile; and decoding a tile ID of a last tile of the tile group in the picture in the tile group header in response to a determination that the flag specifies that the tile information for the coded picture is encoded in the tile group header and that the second flag specifies that the current tile group that refers to the parameter set comprises more than one tile.

Optionally, in the second aspect, wherein parsing, by the processor, the flag that specifies whether tile information for a coded picture is present in a parameter set or in a tile group header comprises inferring that the flag specifies that the tile information for the coded picture is present in only the tile group header in response to a determination that the flag is not present in the parameter set.

Optionally, in any of the preceding aspects, the flag is called tile_group_info_in_pps_flag.

Optionally, in any of the preceding aspects, the second flag is called single_tile_per_tile_group_flag.

Optionally, in any of the preceding aspects, the parameter set is a picture parameter set.

Optionally, in any of the preceding aspects, the parameter set is a sequence parameter set.

Optionally, in any of the preceding aspects, the parameter set is a video parameter set.

A third aspect of the disclosure includes a video coding device comprising: a processor, a receiver coupled to the processor, and a transmitter coupled to the processor, the processor, receiver, and transmitter configured to perform the method of any of the preceding aspects.

A fourth aspect of the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
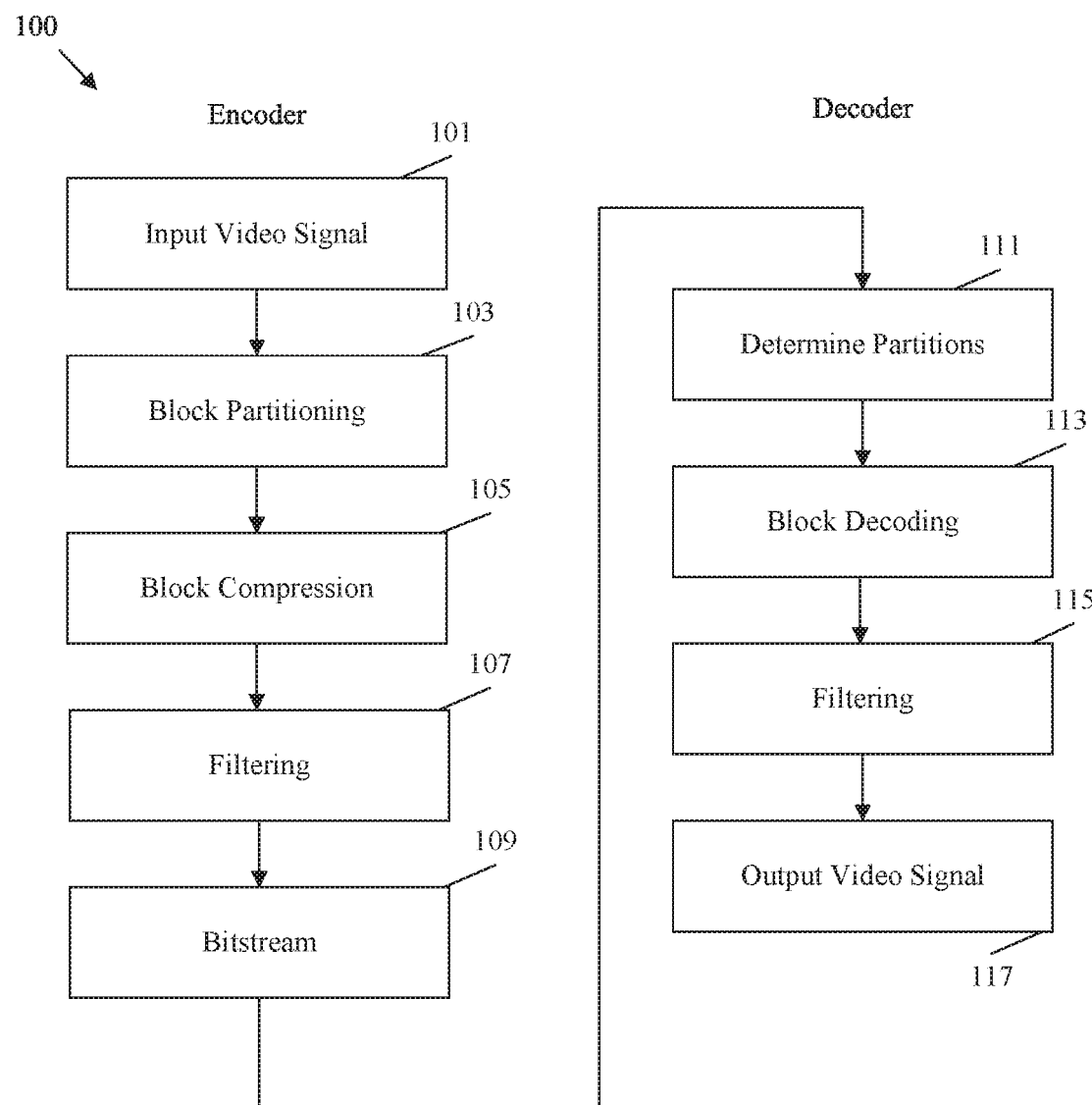
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Many video compression techniques can be employed to reduce the size of video files with minimal loss of data. For example, video compression techniques can include performing spatial (e.g., intra-picture) prediction and/or temporal (e.g., inter-picture) prediction to reduce or remove data redundancy in video sequences. For block-based video coding, a video slice (e.g., a video picture or a portion of a video picture) may be partitioned into video blocks, which may also be referred to as treeblocks, coding blocks (CB s), coding tree blocks (CTBs), coding tree units (CTUs), coding units (CUs), and/or coding nodes. A coding block (CB) is an M×N block of samples for some values of M and N such that the division of a CTB into coding blocks is a partitioning. A coding tree block (CTB) is an N×N block of samples for some value of N such that the division of a component into CTBs is a partitioning. A coding tree unit (CTU) is a CTB of luma samples, two corresponding CTB s of chroma samples of a picture that has three sample arrays, or a CTB of samples of a monochrome picture or a picture that is coded using three separate colour planes and syntax structures used to code the samples. A coding unit (CU) is a coding block of luma samples, two corresponding coding blocks of chroma samples of a picture that has three sample arrays, or a coding block of samples of a monochrome picture or a picture that is coded using three separate colour planes and syntax structures used to code the samples.

Video blocks in an intra-coded (I) slice of a picture are coded using spatial prediction with respect to reference samples in neighboring blocks in the same picture. Video blocks in an inter-coded unidirectional prediction (P) or bidirectional prediction (B) slice of a picture may be coded by employing spatial prediction with respect to reference samples in neighboring blocks in the same picture or temporal prediction with respect to reference samples in other reference pictures. Pictures may be referred to as frames and/or images, and reference pictures may be referred to as reference frames and/or reference images. Spatial or temporal prediction results in a predictive block representing an image block. Residual data represents pixel differences between the original image block and the predictive block. Accordingly, an inter-coded block is encoded according to a motion vector that points to a block of reference samples forming the predictive block and the residual data indicating the difference between the coded block and the predictive block. An intra-coded block is encoded according to an intra-coding mode and the residual data. For further compression, the residual data may be transformed from the pixel domain to a transform domain. These result in residual transform coefficients, which may be quantized. The quantized transform coefficients may initially be arranged in a two-dimensional array. The quantized transform coefficients may be scanned in order to produce a one-dimensional vector of transform coefficients. Entropy coding may be applied to achieve even more compression. Such video compression techniques are discussed in greater detail below.

To ensure an encoded video can be accurately decoded, video is encoded and decoded according to corresponding video coding standards. Video coding standards include International Telecommunication Union (ITU) Standardization Sector (ITU-T) H.261, International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and three dimensional (3D) AVC (3D-AVC). HEVC includes extensions such as Scalable HEVC (SHVC), Multiview HEVC (MV-HEVC), and 3D HEVC (3D-HEVC). The joint video experts team (JVET) of ITU-T and ISO/IEC has begun developing a video coding standard referred to as Versatile Video Coding (VVC). VVC is included in a Working Draft (WD), which includes JVET-L1001-v9.

In order to code a video image, the image is first partitioned, and the partitions are coded into a bitstream. Various picture partitioning schemes are available. For example, an image can be partitioned into regular slices, dependent slices, tiles, and/or according to Wavefront Parallel Processing (WPP). For simplicity, HEVC restricts encoders so that only regular slices, dependent slices, tiles, WPP, and combinations thereof can be used when partitioning a slice into groups of CTBs for video coding. Such partitioning can be applied to support Maximum Transfer Unit (MTU) size matching, parallel processing, and reduced end-to-end delay. MTU denotes the maximum amount of data that can be transmitted in a single packet. If a packet payload is in excess of the MTU, that payload is split into two packets through a process called fragmentation.

A regular slice, also referred to simply as a slice, is a partitioned portion of an image that can be reconstructed independently from other regular slices within the same picture, notwithstanding some interdependencies due to loop filtering operations. A slice contains an integer number of CTUs ordered consecutively in the raster scan. Each slice is encapsulated in its own Network Abstraction Layer (NAL) unit for transmission. Further, in-picture prediction (intra sample prediction, motion information prediction, coding mode prediction) and entropy coding dependency across slice boundaries may be disabled to support independent reconstruction. Such independent reconstruction supports parallelization. For example, regular slice based parallelization employs minimal inter-processor or inter-core communication. However, as each regular slice is independent, each slice is associated with a separate slice header. The use of regular slices can incur a substantial coding overhead due to the bit cost of the slice header for each slice and due to the lack of prediction across the slice boundaries. Further, regular slices may be employed to support matching for MTU size requirements. Specifically, as a regular slice is encapsulated in a separate NAL unit and can be independently coded, each regular slice should be smaller than the MTU in MTU schemes to avoid breaking the slice into multiple packets. As such, the goal of parallelization and the goal of MTU size matching may place contradicting demands to a slice layout in a picture.

Dependent slices are similar to regular slices, but have shortened slice headers and allow partitioning of the image treeblock boundaries without breaking in-picture prediction. Accordingly, dependent slices allow a regular slice to be fragmented into multiple NAL units, which provides reduced end-to-end delay by allowing a part of a regular slice to be sent out before the encoding of the entire regular slice is complete.

A tile is a partitioned portion of an image/picture created by horizontal and vertical boundaries that create columns and rows of tiles. A tile contains a rectangular region of CTUs within a particular tile column and a particular tile row in a picture. Tiles may be coded in raster scan order (right to left and top to bottom). The scan order of CTBs is local within a tile. Accordingly, CTBs in a first tile are coded in raster scan order, before proceeding to the CTBs in the next tile. Similar to regular slices, tiles break in-picture prediction dependencies as well as entropy decoding dependencies. However, tiles may not be included into individual NAL units, and hence tiles may not be used for MTU size matching. Each tile can be processed by one processor/core, and the inter-processor/inter-core communication employed for in-picture prediction between processing units decoding neighboring tiles may be limited to conveying a shared slice header (when adjacent tiles are in the same slice), and performing loop filtering related sharing of reconstructed samples and metadata. When more than one tile is included in a slice, the entry point byte offset for each tile other than the first entry point offset in the slice may be signaled in the slice header.

A given coded video sequence cannot include both tiles and wavefronts for most of the profiles specified in HEVC. For each slice and tile, either or both of the following conditions should be fulfilled: 1) all coded treeblocks in a slice belong to the same tile; 2) all coded treeblocks in a tile belong to the same slice. A wavefront segment contains exactly one CTB row, and when WPP is in use, if a slice starts within a CTB row, it must end in the same CTB row.

In WPP, the image is partitioned into single rows of CTBs. Entropy decoding and prediction mechanisms may use data from CTBs in other rows. Parallel processing is made possible through parallel decoding of CTB rows. For example, a current row may be decoded in parallel with a preceding row. However, decoding of the current row is delayed from the decoding process of the preceding rows by two CTBs. This delay ensures that data related to the CTB above and the CTB above and to the right of the current CTB in the current row is available before the current CTB is coded. This approach appears as a wavefront when represented graphically. This staggered start allows for parallelization with up to as many processors/cores as the image contains CTB rows. Because in-picture prediction between neighboring treeblock rows within a picture is permitted, the inter-processor/inter-core communication to enable in-picture prediction can be substantial. The WPP partitioning does consider NAL unit sizes. Hence, WPP does not support MTU size matching. However, regular slices can be used in conjunction with WPP, with certain coding overhead, to implement MTU size matching as desired.

Tiles may also include motion constrained tile sets. A motion constrained tile set (MCTS) is a tile set designed such that associated motion vectors are restricted to point to full-sample locations inside the MCTS and to fractional-sample locations that require only full-sample locations inside the MCTS for interpolation. Further, the usage of motion vector candidates for temporal motion vector prediction derived from blocks outside the MCTS is disallowed. This way, each MCTS may be independently decoded without the existence of tiles not included in the MCTS. HEVC specifies three MCTS-related supplemental enhancement information (SEI) messages, namely temporal MCTSs SEI message, MCTSs extraction information set SEI message, and MCTSs extraction information nesting SEI message.

Temporal MCTSs SEI messages may be used to indicate the existence of MCTSs in the bitstream and signal the MCTSs. The MCTSs SEI message provides supplemental information that can be used in the MCTS sub-bitstream extraction (specified as part of the semantics of the SEI message) to generate a conforming bitstream for a MCTS. The information includes a number of extraction information sets, each defining a number of MCTSs and containing raw bytes sequence payload (RBSP) bytes of the replacement video parameter sets (VPSs), sequence parameter sets (SPSs), and picture parameter sets (PPSs) to be used during the MCTS sub-bitstream extraction process. When extracting a sub-bitstream according to the MCTS sub-bitstream extraction process, parameter sets (VPSs, SPSs, and PPSs) may be rewritten or replaced, and slice headers may updated because one or all of the slice address related syntax elements (including first_slice_segment_in_pic_flag and slice_segment_address) may employ different values in the extracted sub-bitstream.

As described above, a tile group contains an integer number of tiles of a picture in a tile raster scan of the picture or in a rectangular grouping. The tiles in the tile group are exclusively contained in a single NAL unit. Tile groups can take the place of slices in some examples. There are various tiling schemes (i.e., approach for tile grouping) that may be employed when partitioning a picture for further encoding. As a particular example, tile grouping can be constrained such that the tiles that are grouped together into a tile group shall form a rectangular shape of area within a picture (referred to herein as a rectangular tile group). The tiles contained in the tile group may be signaled by indicating the first tile and last tile of the tile group. In such a case, a tile index of the first tile may be a smaller value than the tile index of the last tile.

There are two possibilities for signaling of tile group structure (e.g., address/location of the tile group within a picture and the number of tiles in a tile group, if needed). The first is to signal tile group structure in parameter set, for example in picture parameter set (PPS). The second is to signal tile group structure in the header of each tile group. The two signaling possibilities should not be used at the same time. Each possibility has its own benefit. For example, the first option is beneficial for applications such as 360 degree video, wherein tile groups are usually coded as MCTSs to enable sending only parts of each picture. In this case, allocation of tiles into video coding layer (VCL) NAL units is usually known encoding of the pictures. The second option is beneficial in application scenarios wherein allocation of tiles into VCL NAL units may need to depend on the actual sizes in bits of the tiles, e.g., in ultralow delay applications such as wireless display. When tile group structure is signaled in a parameter set, some syntax elements in the tile group header may not be needed and thus may be removed or their presence may need to be conditioned.

In some applications, a picture may be encapsulated into several VCL NAL units, with each VCL NAL unit containing one tile group. For such applications, parallel processing may not be the main objective/interest because each tile group for this application would contain only one tile. An example could be 360 degree video applications that have viewport-dependent delivery optimizations. In such a situation, the current signaling of tile group structure, whether it is signaled in a parameter set or in a tile group header, would have some redundancy.

Disclosed herein are various mechanisms to improve tile group structure signaling to address the issues described above. As will be further explained, in an embodiment, the encoder can encode a flag (e.g., a flag called single_tile_per_tile_group_flag) in a parameter set that is directly or indirectly referred to by tile groups to specify whether each of the tile groups that refer to the parameter set contains only one tile. For example, if the single_tile_per_tile_group_flag is set to one (1) or true, certain syntax elements (e.g., a syntax element that specifies the number of tiles in the tile group) are excluded in the tile group header. Other syntax elements can also be excluded from the tile header as further described herein. Additionally, in some embodiments, the encoder can encode a flag (e.g., a flag called tile_group_info_in_pps_flag) in the parameter set to specify whether the tile group structure information is present in the parameter set. The value of tile_group_info_in_pps_flag is used to condition the presence of tile group structure related syntax elements in the parameter set and tile group headers. In certain embodiments, the tile_group_info_in_pps_flag can be encoded in lieu of, or in addition to, the single_tile_per_tile_group_flag.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, deblocking filters, adaptive loop filters, and SAO filters may be applied to the frames to remove blocking artifacts. Once the frames are filtered, the video signal can be output to a display at step 117 for viewing by an end user.

Figure 2:
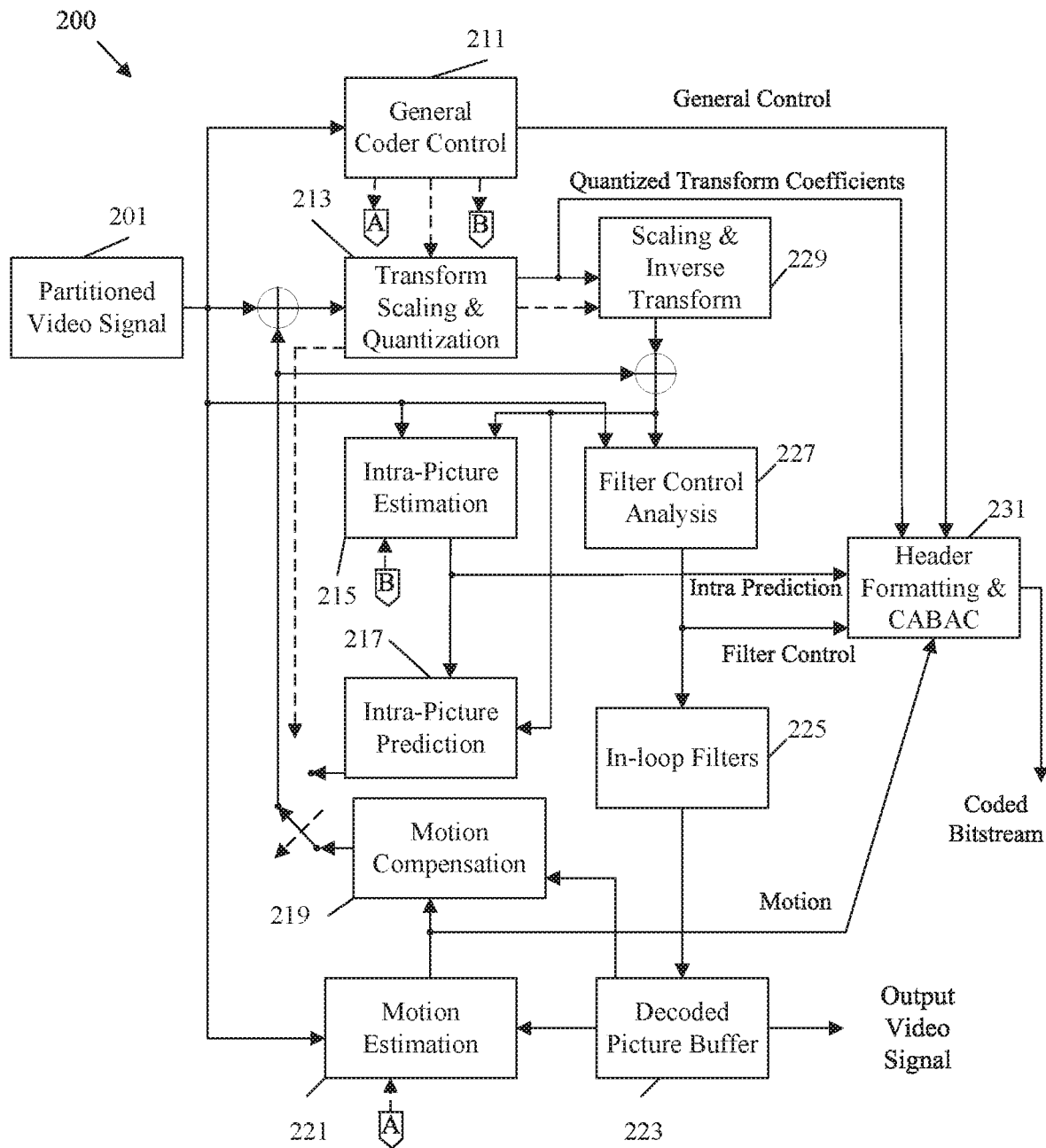
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
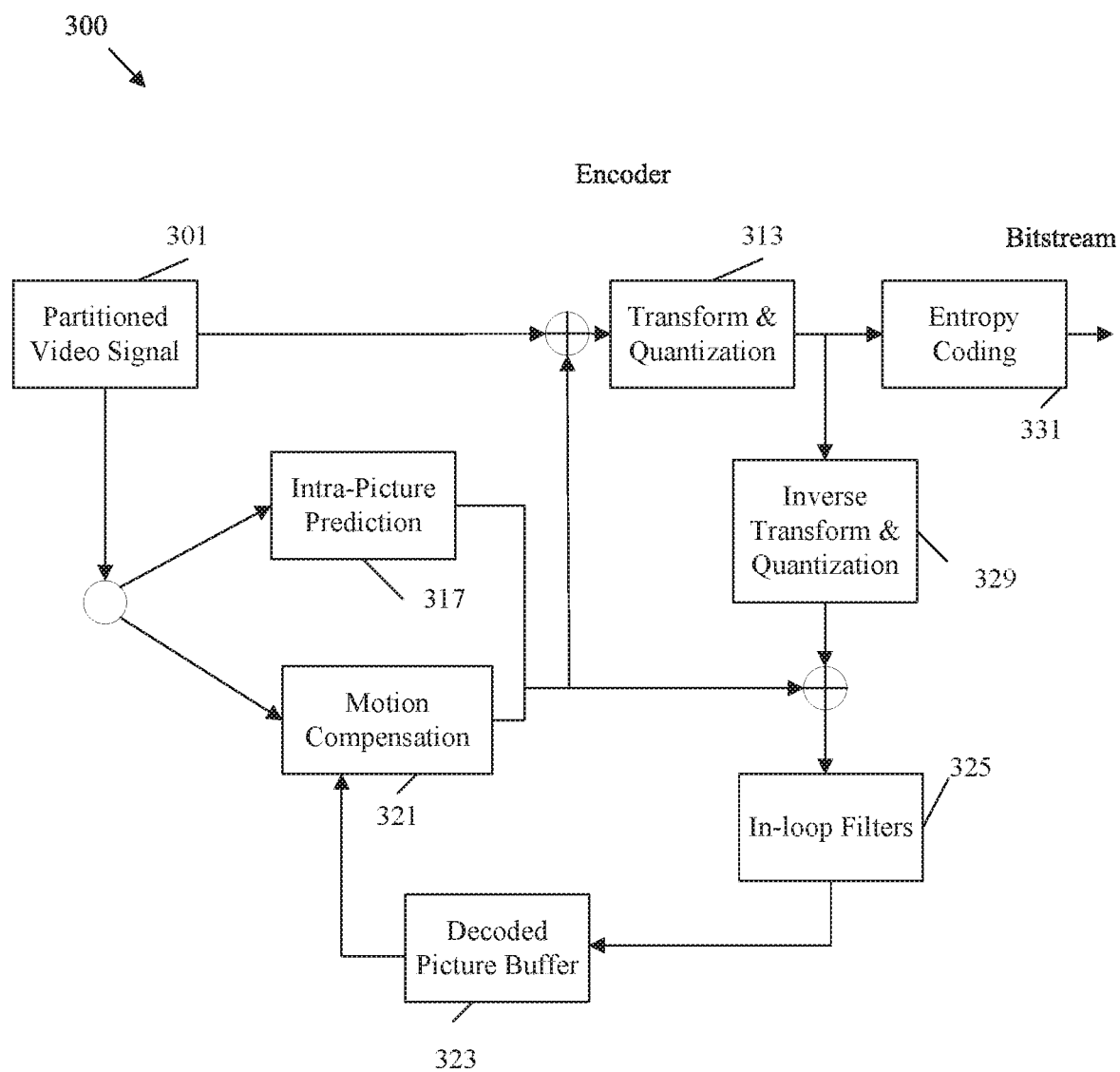
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
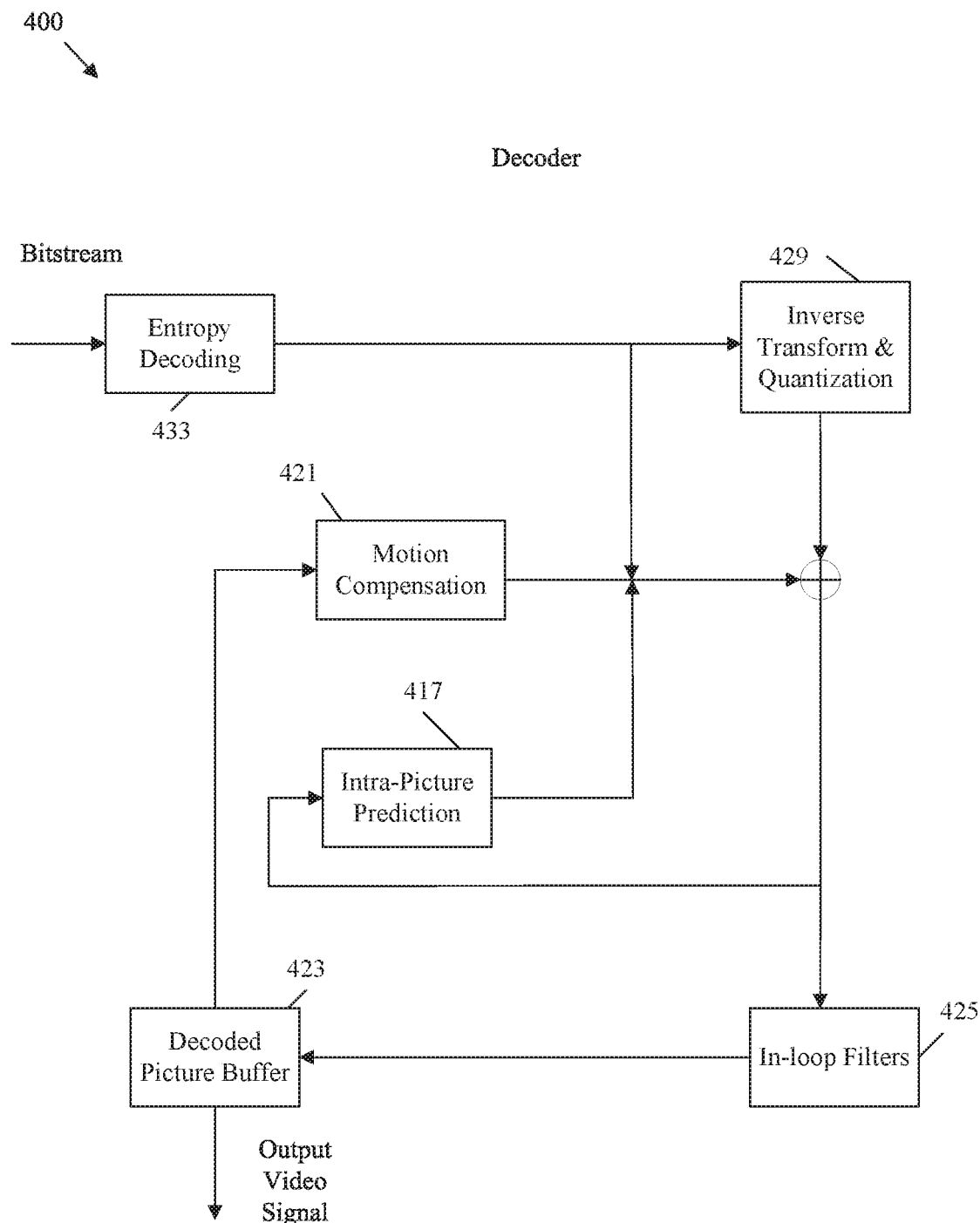
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
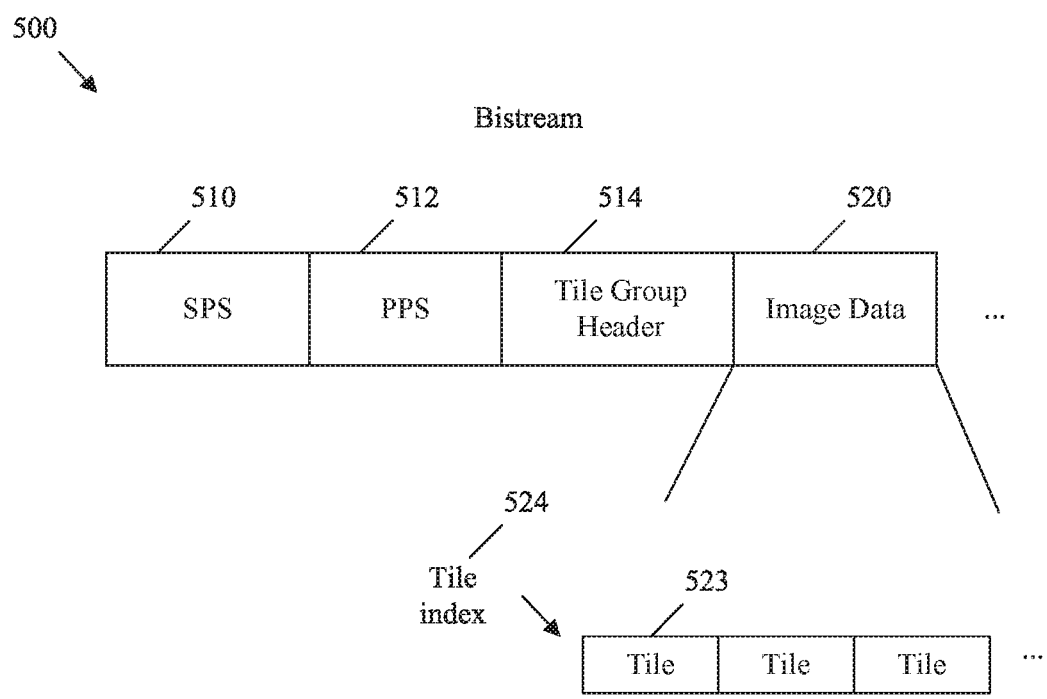
FIG. 5 is a schematic diagram illustrating an example bitstream containing an encoded video sequence.

FIG. 5 is a schematic diagram illustrating an example bitstream 500 containing an encoded video sequence. For example, the bitstream 500 can be generated by a codec system 200 and/or an encoder 300 for decoding by a codec system 200 and/or a decoder 400. As another example, the bitstream 500 may be generated by an encoder at step 109 of method 100 for use by a decoder at step 111.

The bitstream 500 includes a sequence parameter set (SPS) 510, a plurality of picture parameter sets (PPSs) 512, a tile group headers 514, and image data 520. An SPS 510 contains sequence data common to all the pictures in the video sequence contained in the bitstream 500. Such data can include picture sizing, bit depth, coding tool parameters, bit rate restrictions, etc. The PPS 512 contains parameters that are specific to one or more corresponding pictures. Hence, each picture in a video sequence may refer to one PPS 512. The PPS 512 can indicate coding tools available for tiles in corresponding pictures, quantization parameters, offsets, picture specific coding tool parameters (e.g., filter controls), etc. The tile group header 514 contains parameters that are specific to each tile group in a picture. Hence, there may be one tile group header 514 per tile group in the video sequence. The tile group header 514 may contain tile group information, picture order counts (POCs), reference picture lists, prediction weights, tile entry points, deblocking parameters, etc. It should be noted that some systems refer to the tile group header 514 as a slice header, and use such information to support slices instead of tile groups.

The image data 520 contains video data encoded according to inter-prediction and/or intra-prediction as well as corresponding transformed and quantized residual data. Such image data 520 is sorted according to the partitioning used to partition the image prior to encoding. For example, the image in the image data 520 is divided into tiles 523. The tiles 523 are further divided into coding tree units (CTUs). The CTUs are further divided into coding blocks based on coding trees. The coding blocks can then be encoded/decoded according to prediction mechanisms. An image/picture can contain one or more tiles 523.

A tile 523 is a partitioned portion of a picture created by horizontal and vertical boundaries. Tiles 523 may be coded in raster scan order, and may or may not allow prediction based on other tiles 523, depending on the example. Each tile 523 may have a unique tile index 524 in the picture. A tile index 524 is a procedurally selected numerical identifier that can be used to distinguish one tile 523 from another. For example, tile indices 524 may increase numerically in raster scan order. Raster scan order is left to right and top to bottom. It should be noted that, in some examples, tiles 523 may also be assigned tile identifiers (IDs). A tile ID is an assigned identifier that can be used to distinguish one tile 523 from another. Computations may employ tile IDs instead of tile indices 524 in some examples. Further, tile IDs can be assigned to have the same values as the tile indices 524 in some examples.

Tile indices 524 may be signaled to indicate tile groups containing the tiles 523. A first tile index and a last tile index can be signaled in the tile group header 514. In some examples, the first tile index and last tile index are signaled by corresponding tile IDs. The decoder can then determine the configuration of the tile group based on the flag, the first tile index, and the last tile index. The encoder can employ similar procedures to the decoder during a rate distortion optimization process in order to predict the decoding results at the decoder when selecting an optimized encoding approach. By signaling only the first tile index and the last tile index instead of the complete membership of the tile group, a substantial number of bits can be omitted. This increases coding efficiency, and hence reduces memory resource usage and network resource usage for both the encoder and decoder.

Figure 6:
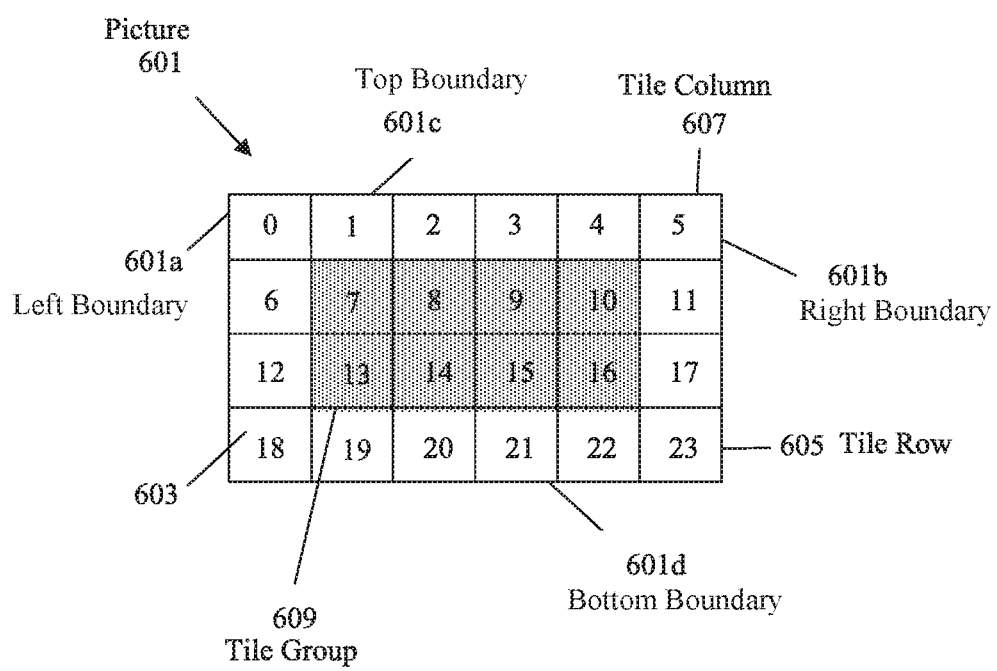
FIG. 6 is a schematic diagram illustrating a picture partitioned into an example tile group.

FIG. 6 illustrates an example picture 601 partitioned into an example tile group in accordance with an embodiment of the present disclosure. For example, picture 601 can be a single picture in a video sequence that is encoded in and decoded from a bitstream 500, for example by a codec system 200, an encoder 300, and/or a decoder 400. Further, picture 601 can be partitioned to support encoding and decoding according to method 100.

The picture 601 can be partitioned into tiles 603. A tile 603 may be substantially similar to a tile 523. Tiles 603 may be rectangular and/or square. The tiles 603 are each assigned a tile index, which increases in raster scan order. In the depicted embodiment, the tile indices extend from zero to twenty three (0-23). Such tile indices are exemplary and provided for clarity of discussion, and therefore should not be considered limiting.

The picture 601 contains a left boundary 601a comprising tiles 0, 6, 12, and 18; a right boundary 601b comprising tiles 5, 11, 17, and 23; a top boundary 601c comprising tiles 0-5; and a bottom boundary 601d comprising tiles 18-23. The left boundary 601a, right boundary 601b, top boundary 601c, and bottom boundary 601d form the edges of the picture 601. Further, the tiles 603 may be partitioned into tile rows 605 and tile columns 607. A tile row 605 is a set of tiles 603 positioned in a horizontally adjacent manner to create a continuous line from the left boundary 601a to the right boundary 601b (or vice versa). A tile column 607 is a set of tiles 603 positioned in a vertically adjacent manner to create a continuous line from the top boundary 601c to the bottom boundary 601d (or vice versa).

The tiles 603 can be included in one or more tile groups 609. A tile group 609 is a related set of tiles 603 that can be separately extracted and coded, for example to support display of a region of interest and/or to support parallel processing. Tiles 603 in a tile group 609 can be coded without reference to tiles 603 outside of the tile group 609. Each tile 603 may be assigned to a corresponding tile group 609, and therefore a picture 601 can contain a plurality of tile groups 609. However, for clarity of discussion, the present disclosure refers to the tile group 609 depicted as a shaded region including tiles 603 with indices seven through ten (7-10) and thirteen through sixteen (13-16).

Accordingly, the tile group 609 of picture 601 can be signaled by a first tile index of seven and a last tile index of sixteen. A decoder may wish to determine a configuration of the tile group 609 based on the first tile index and the last tile index. As used herein, a tile group 609 configuration indicates the rows, columns, and tiles 603 in the tile group 609. In order to determine the tile group 609 configuration a video coding device can employ a predefined algorithm. For example, a video coding device can determine a number of tiles 603 in the tile group 609 partitioned from the picture 601 by setting a delta tile index as a difference between a last tile index of the tile group 609 and a first tile index of the tile group 609. A number of tile rows 605 in the tile group 609 can be determined by dividing the delta tile index by a number of tile columns 607 in the picture 601 plus one. Further, a number of tile columns 607 in the tile group 609 can be determined as the delta tile index modulo the number of tile columns 607 in the picture 601 plus one. The number of tiles 603 in the tile group 609 can be determined by multiplying the number of tile columns 607 in the tile group 609 by the number of tile rows 605 in the tile group 609.

As described above, in certain situations, the current signaling of a tile group structure, whether it is signaled in a parameter set or in tile group header, includes some redundant information. In order to address this issue, the following aspects, taken alone or applied in combination in one or more embodiments, are proposed in the present disclosure for resolving the above issues.

In an embodiment, when there is more than one tile per picture, a flag is signaled in a parameter set that is directly or indirectly referred to by tile groups to specify whether each of the tile groups that refer to the parameter set contains only one tile. The parameter set can be a sequence parameter set, picture parameter set, or any other parameter set that is referred to directly or indirectly by tile groups. In an embodiment, this flag may be called single_tile_per_tile_group_flag. In an embodiment, when the value of single_tile_per_tile_group_flag is equal to 1, the following syntax elements in tile group header are not present: (1) the syntax element that specifies the number of tiles in the tile group, (2) the syntax element that specifies the last tile identification of the tile group, and (3) the syntax element that specifies the tile identification of any tile other than the first tile in the tile group.

In another embodiment, the tile group structure information may be signaled either in a parameter set that is directly or indirectly referred to by each tile group or directly in the tile group header. When the number of tiles in a picture is greater than one, a flag may be present in the parameter set to specify whether the tile group structure information is present in the parameter set. The parameter set can be a sequence parameter set, picture parameter set, or any other parameter set that is referred to directly or indirectly by tile groups. In an embodiment, the flag may be called tile_group_info_in_pps_flag. In an embodiment, when the flag is not present in the parameter set (e.g., when a picture contains only one tile), the value of tile_group_info_in_pps_flag is inferred to be equal to 0. The value of tile_group_info_in_pps_flag is used to condition the presence of tile group structure related syntax elements in the parameter set and tile group headers. These syntax elements may include: (1) the syntax element that specifies the number of tiles in the tile group, (2) the syntax element that specifies the last tile identification of the tile group, and (3) the syntax element that specifies the tile identification of any tile other than the first tile in the tile group.

The syntax and semantics of related syntax elements in PPS and the tile group header according to an embodiment are as follows. The description is relative to the basis text, which is described in JVET contribution JVET-L0686 entitled "Draft text of video coding specification." That is, only the delta or additional modification is described, while the texts in the basis text that are not mentioned below apply as they are as described in the basis text. The modified text to the pic_parameter_set_rbsp( ) function relative to the basis text is highlighted with an asterisk (*)

|  |  | Descriptor |
|---|---|---|
|  | pic_parameter_set_rbsp( ) { |  |
|  |     pps_pic_parameter_set_id | ue(v) |
|  |     pps_seq_parameter_set_id | ue(v) |
|  |     transform_skip_enabled_flag | u(1) |
|  |     single_tile_in_pic_flag | u(1) |
|  |     if( !single_tile_in_pic_flag ) { |  |
|  |         ... |  |
| (*) |         single_tile_per_tile_group_flag | u(1) |
| (*) |         tile_group_info_in_pps_flag | u(1) |
| (*) |         if( tile_group_info_in_pps_flag ) { |  |

|  | Descriptor |
|---|---|
| (*)          num_tile_groups_in_pic_minus1 | ue(v) |
| (*)          for( i = 0; i <= num_tile_groups_in_pic_minus1; i++ ) { | |
| (*)              pps_first_tile_id[ i ] | u(v) |
| (*)              if( !single_tile_per_tile_group_flag ) | |
| (*)                  pps_num_tiles_in_tile_group_minus1[ i ] | ue(v) |
| (*)          } | |
| (*)     } | |
|     } | |
|     rbsp_trailing_bits( ) | |
| } | |

In the above picture parameter set RBSP, the syntax element pps_pic_parameter_set_id identifies the PPS for reference by other syntax elements. In an embodiment, the value of pps_pic_parameter_set_id shall be in the range of 0 to 63, inclusive. The syntax element pps_seq_parameter_set_id specifies the value of sps_seq_parameter_set_id for the active SPS. The value of pps_seq_parameter_set_id shall be in the range of 0 to 15, inclusive. In an embodiment, if the syntax element transform_skip_enabled_flag equals to 1, then the transform_skip_flag syntax element may be present in the residual coding syntax. If the syntax element transform_skip_enabled_flag equals to 0, then the transform_skip_flag syntax element is not present in the residual coding syntax. If the syntax element single_tile_in_pic_flag equals to 1, this indicates that there is only one tile in each picture referring to the PPS. If the syntax element single_tile_in_pic_flag equals to 0 (i.e., if(! single_tile_in_pic_flag)), this specifies that there is more than one tile in each picture referring to the PPS. In this case, the syntax element single_tile_per_tile_group_flag is used to indicate whether each tile group that refers to the PPS contains exactly one tile. For example, if the syntax element single_tile_per_tile_group_flag is equal to 1, this specifies that each tile group that refers to the PPS contains exactly one tile. If the syntax element single_tile_per_tile_group_flag is equal to 0, then it indicates that each tile group that refers to the parameter set contains one or more tiles. The syntax element tile_group_info_in_pps_flag is used to indicate whether the tile group information is present in the PPS or present in the tile group headers referring to the PPS. In an embodiment, if the syntax element tile_group_info_in_pps_flag is equal to 1, this specifies that tile group information is present in the PPS and not present in tile group headers referring to the PPS. If the syntax element tile_group_info_in_pps_flag is equal to 0, then it indicates that tile group information is not present in the PPS and is present in tile group headers referring to the PPS.

In the depicted embodiment, if the syntax element tile_group_info_in_pps_flag is equal to 1 (i.e., if(tile_group_info_in_pps_flag)), which specifies that tile group information is present in the PPS and not present in tile group headers referring to the PPS, then a variable num_tile_groups_in_pic_minus1 is set to be equal to one less than the number of tile groups in the picture. This variable is used in a for-loop to loop through each of the tile groups in the picture. The syntax element pps_first_tile_id[i] specifies the tile ID of the first tile of the i-th tile group in the picture. In an embodiment, the length of pps_first_tile_id [i] is Ceil(Log 2(NumTilesInPic)) bits. The value of pps_first_tile_id[i] shall not be equal to the value of pps_first_tile_id[j] for any i not equal to j. Otherwise stated, the tile ID of the first tile of the i-th tile group in the picture shall not be the same as the tile ID of the first tile of any other tile group in the picture.

For each i-th tile group in the picture, if the syntax element single_tile_per_tile_group_flag is equal to 0 (i.e., if(! single_tile_per_tile_group_flag)), which indicates that the i-th tile group that refers to the parameter set contains one or more tiles, then the syntax element pps_num_tiles_in_tile_group_minus1[i] plus 1 is used to specify the number of tiles in the i-th tile group. The value of pps_num_tiles_in_tile_group_minus1[i] shall be in the range of 0 to NumTilesInPic−1, inclusive. In an embodiment, when the syntax element pps_num_tiles_in_tile_group_minus1 [i] is not present, the value of pps_num_tiles_in_tile_group_minus1[i] is inferred to be equal to 0.

As another example, the syntax and semantics of related syntax elements in PPS and the tile group header according to second embodiment are as follows. As stated above, the description is relative to the basis text, which is described in JVET contribution JVET-L0686 entitled "Draft text of video coding specification." That is, only the delta or additional modification is described, while the texts in the basis text that are not mentioned below apply as they are as described in the basis text. The modified text to the pic_parameter_set_rbsp( ) function relative to the basis text is highlighted with an asterisk (*).

|  |  | Descriptor |
|---|---|---|
| | pic_parameter_set_rbsp( ) { | |
| |     pps_pic_parameter_set_id | ue(v) |
| |     pps_seq_parameter_set_id | ue(v) |
| |     transform_skip_enabled_flag | u(1) |
| |     single_tile_in_pic_flag | u(1) |
| |     if( !single_tile_in_pic_flag ) { | |
| |         ... | |
| (*) |         single_tile_per_tile_group_flag | u(1) |
| (*) |         tile_group_info_in_pps_flag | u(1) |
| (*) |         if( tile_group_info_in_pps_flag ) { | |
| (*) |             num_tile_groups_in_pic_minus1 | ue(v) |
| (*) |             for( i = 0; i <= num_tile_groups_in_pic_minus1; i++ ) { | |

-continued

| | Descriptor |
|---|---|
| (*)                pps_first_tile_id[ i ] | u(v) |
| (*)                if( !single_tile_per_tile_group_flag ) | |
| (*)                    pps_last_tile_id[ i ] | u(v) |
| (*)                } | |
| (*)            } | |
|     } | |
|     rbsp_trailing_bits( ) | |
| } | |

The syntax elements pps_pic_parameter_set_id, pps_seq_parameter_set_id, transform_skip_enabled_flag, and single_tile_in_pic_flag are as previously described above according to the basis text (JVET contribution JVET-L0686). In this embodiment, if the syntax element single_tile_in_pic_flag equals to 0 (i.e., if(!single_tile_in_pic_flag)), which indicates that each tile group that refers to the parameter set contains one or more tiles, a single_tile_per_tile_group_flag syntax element is used to indicate whether each tile group that refers to the PPS contains exactly one tile. In an embodiment, if single_tile_per_tile_group_flag is equal to 1, it indicates that each tile group that refers to the PPS contains exactly one tile. If single_tile_per_tile_group_flag is equal to 0, then it specifies that each tile group that refers to the PPS contains one or more tiles. A tile_group_info_in_pps_flag syntax element is used to indicate whether tile group information is present in the PPS or present in tile group headers referring to the PPS. In an embodiment, if tile_group_info_in_pps_flag equals to 1, it specifies that tile group information is present in the PPS and not present in tile group headers referring to the PPS. When tile_group_info_in_pps_flag equals to 0, it indicates that tile group information is not present in the PPS and is present in tile group headers referring to the PPS.

In the depicted embodiment, if tile_group_info_in_pps_flag equals to 1 (i.e., if(tile_group_info_in_pps_flag)), it indicates that tile group information is present in the PPS and not present in tile group headers referring to the PPS, then a variable num_tile_groups_in_pic_minus1 is set to be equal to one less than the number of tile groups in the picture. This variable is used in a for-loop to loop through each of the tile groups in the picture. The syntax element pps_first_tile_id[i] specifies the tile ID of the first tile of the i-th tile group in the picture. The value of pps_first_tile_id[i] shall not be equal to the value of pps_first_tile_id[j] for any i not equal to j. In this embodiment, if there is more than one tile per tile group (i.e., if(!single_tile_per_tile_group_flag)), the syntax element pps_last_tile_id[i] specifies the tile ID of the tile of the last tile of the i-th tile group. The length of pps_first_tile_id[i] and pps_last_tile_id[i] is Ceil(Log 2(NumTilesInPic)) bits.

In an embodiment, the tile group header and RBSP syntax and semantics are as follows. The modified text to the tile_group_header( ) function relative to the basis text is highlighted with an asterisk (*).

| | Descriptor |
|---|---|
| tile_group_header( ) { | |
|    ... | |
|    if( NumTilesInPic> 1 ) { | |
| (*)      first_tile_id | u(v) |
| (*)      if( !single_tile_per_tile_group_flag && | |
|         !tile_group_info_in_pps_flag ) | |

-continued

| | Descriptor |
|---|---|
| (*)        last_tile_id | u(v) |
|    } | |
| ... | |

In the depicted embodiment, if the number of tiles in the picture (NumTilesInPic) is greater than 1, a syntax element first_tile_id is used to specify the tile ID of the first tile of the tile group. The length of first_tile_id is Ceil(Log 2(NumTilesInPic)) bits. The value of first_tile_id of a tile group shall not be equal to the value of first_tile_id of any other tile group of the same picture. If single_tile_per_tile_group_flag specifies that there is more than one tile per tile group (i.e., if(!single_tile_per_tile_group_flag)) and the tile_group_info_in_pps_flag indicates that tile group information is not present in the PPS and is present in tile group headers referring to the PPS (i.e., !tile_group_info_in_pps_flag), a syntax element last_tile_id is used to specify the tile ID of the last tile of the tile group. In an embodiment, the length of last_tile_id is Ceil(Log 2(NumTilesInPic)) bits.

In an embodiment, when NumTilesInPic is equal to 1 or single_tile_per_tile_group_flag is equal to 1, the value of last_tile_id is inferred to be equal to first_tile_id. In an embodiment, when tile_group_info_in_pps_flag is equal to 1, the value of last_tile_id is inferred to be equal to the value of pps_first_tile_id[i] where i is the value such that first_tile_id is equal to pps_first_tile_id[i]. In this embodiment, it may be additionally constrained that each tile group contains a rectangular region of a picture. In this case, first_tile_id specifies the tile ID of the tile located at the top-left corner of the tile group, and last_tile_id specifies the tile ID of the tile located at the bottom-right corner of the tile group.

In an embodiment, a syntax element can be additionally signaled in the PPS to specify the tile group mode, which allows at least the following two tile group modes. In a first mode, referred to as rectangular tile group mode, it is additionally constrained that each tile group contains a rectangular region of a picture. In this case, first_tile_id specifies the tile ID of the tile located at the top-left corner of the tile group, and last_tile_id specifies the tile ID of the tile located at the bottom-right corner of the tile group. In a second mode, referred to as tile raster scan mode, no additional change is made, and the tiles included in each tile group are sequence tiles in the tiles raster scan of a picture.

Figure 7:
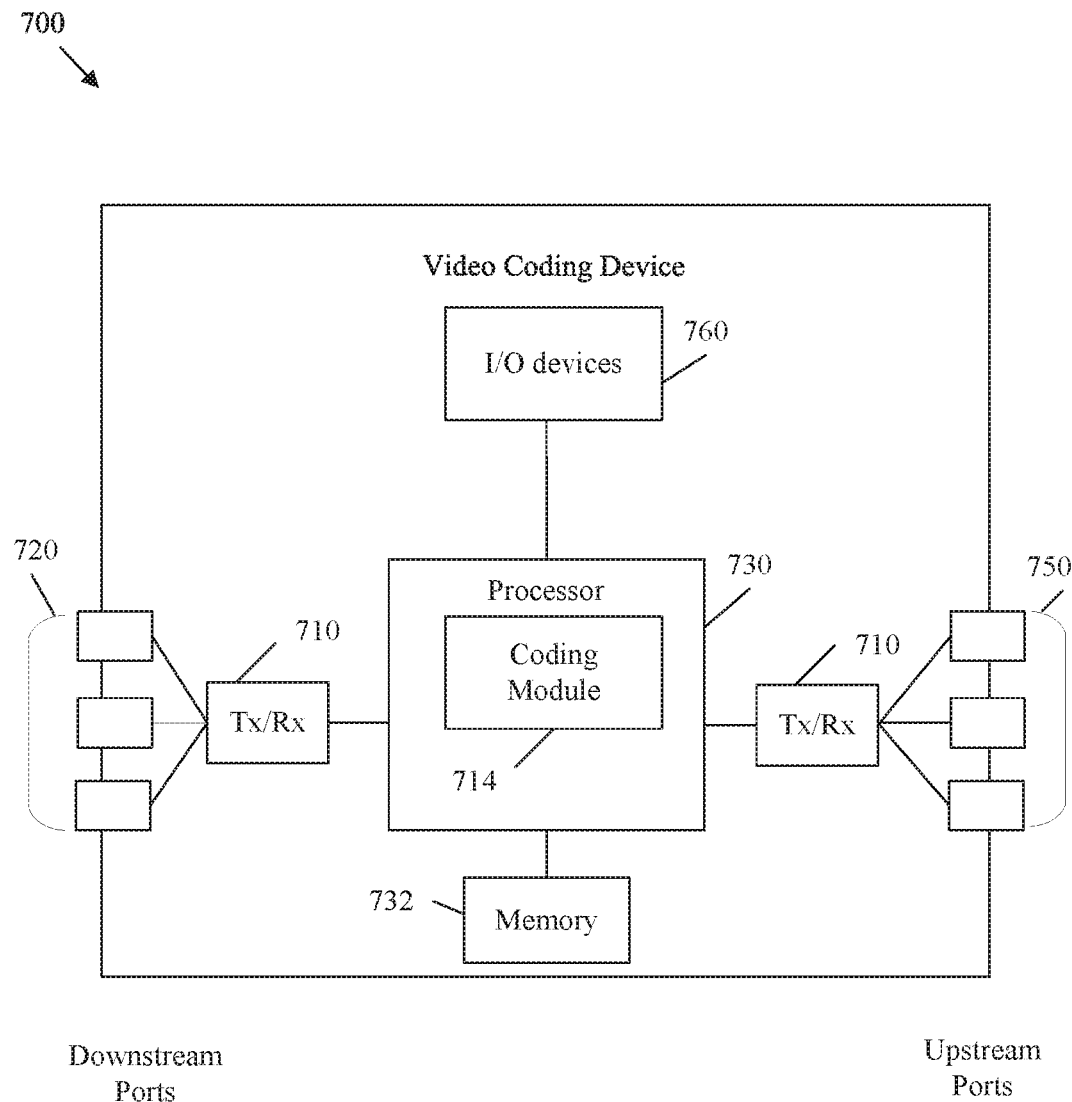
FIG. 7 is a schematic diagram of an example video coding device.

FIG. 7 is a schematic diagram of an example video coding device 700. The video coding device 700 is suitable for implementing the disclosed examples/embodiments as described herein. The video coding device 700 comprises downstream ports 720, upstream ports 750, and/or transceiver units (Tx/Rx) 710, including transmitters and/or receivers for communicating data upstream and/or downstream over a network. The video coding device 700 also includes a processor 730 including a logic unit and/or central processing unit (CPU) to process the data and a memory 732 for storing the data. The video coding device 700 may also comprise electrical, optical-to-electrical (OE) components, electrical-to-optical (EO) components, and/or wireless communication components coupled to the upstream ports 750 and/or downstream ports 720 for communication of data via electrical, optical, or wireless communication networks. The video coding device 700 may also include input and/or output (I/O) devices 760 for communicating data to and from a user. The I/O devices 760 may include output devices such as a display for displaying video data, speakers for outputting audio data, etc. The I/O devices 760 may also include input devices, such as a keyboard, mouse, trackball, etc., and/or corresponding interfaces for interacting with such output devices.

The processor 730 is implemented by hardware and software. The processor 730 may be implemented as one or more CPU chips, cores (e.g., as a multi-core processor), field-programmable gate arrays (FPGAs), application specific integrated circuits (ASICs), and digital signal processors (DSPs). The processor 730 is in communication with the downstream ports 720, Tx/Rx 710, upstream ports 750, and memory 732. The processor 730 comprises a coding module 714. The coding module 714 implements the disclosed embodiments described herein, such as methods 100, 800, and 900 which may employ a bitstream 500 and/or an image partitioned into tile groups 609. The coding module 714 may also implement any other method/mechanism described herein. Further, the coding module 714 may implement a codec system 200, an encoder 300, and/or a decoder 400. For example, when acting as an encoder, the coding module 714 can encode a video bitstream that comprises coded data for at least one picture that contains at least one tile group. The coding module 714 can also encode a flag in a parameter set that specifies whether tile information for a coded picture is present in the parameter set or in tile group headers. When acting as a decoder, the coding module 714 can read the flag indicating whether tile information for a coded picture is present in a parameter set or in tile group headers. As such, the coding module 714 improves the functionality of the video coding device 700 as well as addresses problems that are specific to the video coding arts to reduce or remove data redundancy in video sequences (and hence increasing coding efficiency) without negatively impacting tile group signaling. Further, the coding module 714 effects a transformation of the video coding device 700 to a different state. Alternatively, the coding module 714 can be implemented as instructions stored in the memory 732 and executed by the processor 730 (e.g., as a computer program product stored on a non-transitory medium).

The memory 732 comprises one or more memory types such as disks, tape drives, solid-state drives, read only memory (ROM), random access memory (RAM), flash memory, ternary content-addressable memory (TCAM), static random-access memory (SRAM), etc. The memory 732 may be used as an over-flow data storage device, to store programs when such programs are selected for execution, and to store instructions and data that are read during program execution.

Figure 8:
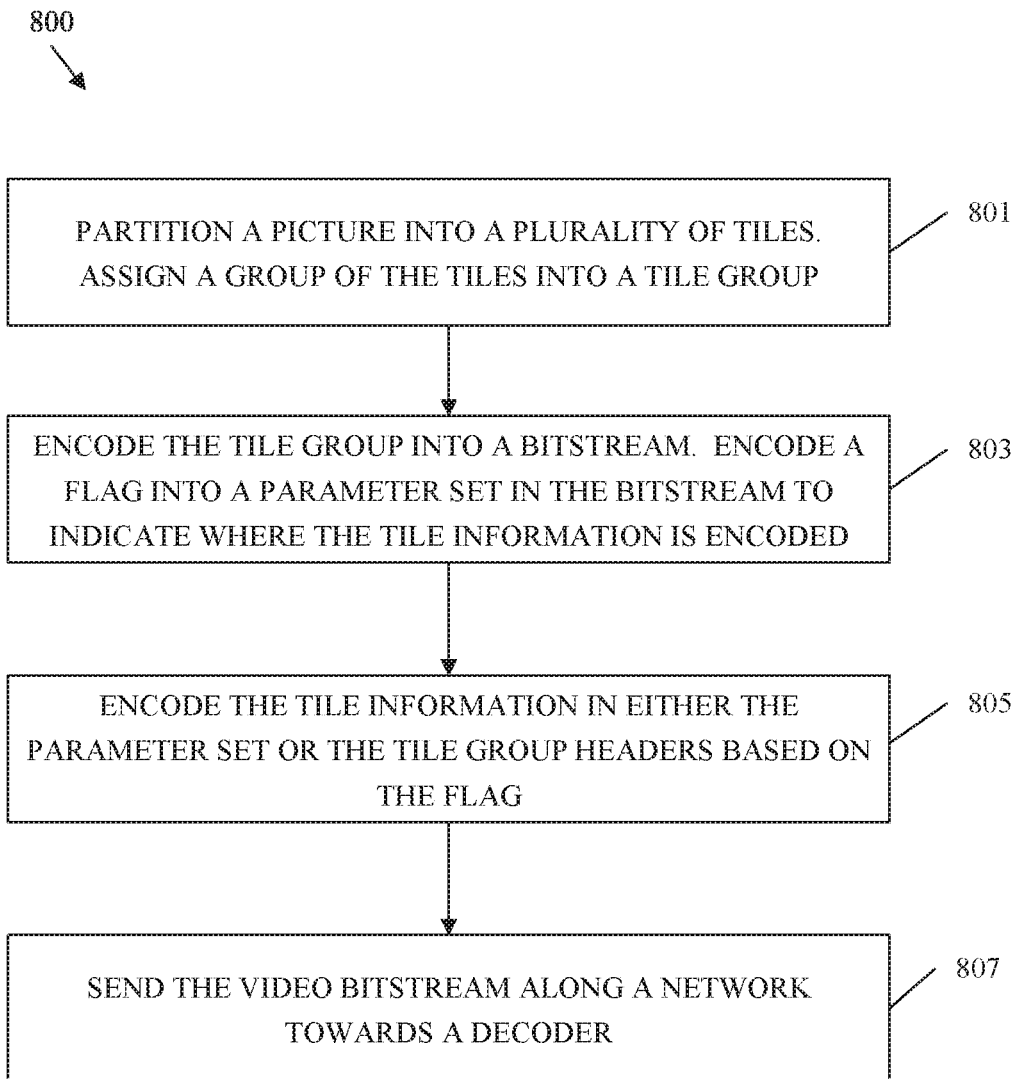
FIG. 8 is a flowchart of an example method of encoding an image with a flag indicating a location of tile group information into a bitstream.

FIG. 8 is a flowchart of an example method 800 of encoding an image, such as picture 601 into a bitstream, such as bitstream 500. Method 800 may be employed by an encoder, such as a codec system 200, an encoder 300, and/or a video coding device 700 when performing method 100.

Method 800 may begin when an encoder receives a video sequence including a plurality of images and determines to encode that video sequence into a bitstream, for example based on user input. The video sequence is partitioned into pictures/images/frames for further partitioning prior to encoding. At step 801, a picture is partitioned into a plurality of tiles. The tiles can be further partitioned into a plurality of CTUs, which can be further partitioned into coding blocks for application of prediction based compression. A group of the tiles are also assigned into a tile group.

At step 803, the tile group is encoded into a bitstream that comprises coded data for at least one picture. Each of the pictures include at least one tile group. Further, a flag is encoded into a parameter set in the bitstream. The flag indicates whether tile information for a coded picture is present in a parameter set or in tile group headers. The tile information indicates which tiles of the picture are included in a tile group. As a particular example, the flag is a tile_group_info_in_pps_flag. For example, the flag can be encoded into a PPS associated with the picture.

At step 805, the tile information is encoded in either the parameter set or the tile group headers based on the flag. In an embodiment, when the syntax element tile_group_info_in_pps_flag is equal to 1, this specifies that tile group information is present in the parameter set and not present in tile group headers referring to the parameter set. When the syntax element tile_group_info_in_pps_flag is equal to 0, then it indicates that tile group information is not present in the parameter set and is present in tile group headers referring to the parameter set. In an embodiment, when the flag is not present in the parameter set (e.g., when a picture contains only one tile), the value of tile_group_info_in_pps_flag is inferred to be equal to 0. The tile group information can include a syntax element that specifies the number of tiles in the tile group, a syntax element that specifies the last tile identification of the tile group, and a syntax element that specifies the tile identification of any tile other than the first tile in the tile group.

At step 807, the video bitstream is transmitted or sent along a network towards a decoder. In an embodiment, the video bitstream is transmitted upon request. The video bitstream can also be automatically pushed out by the encoder to the decoder. In an embodiment, the coded video bitstream can be temporarily or permanently stored at the encoder.

Figure 9:
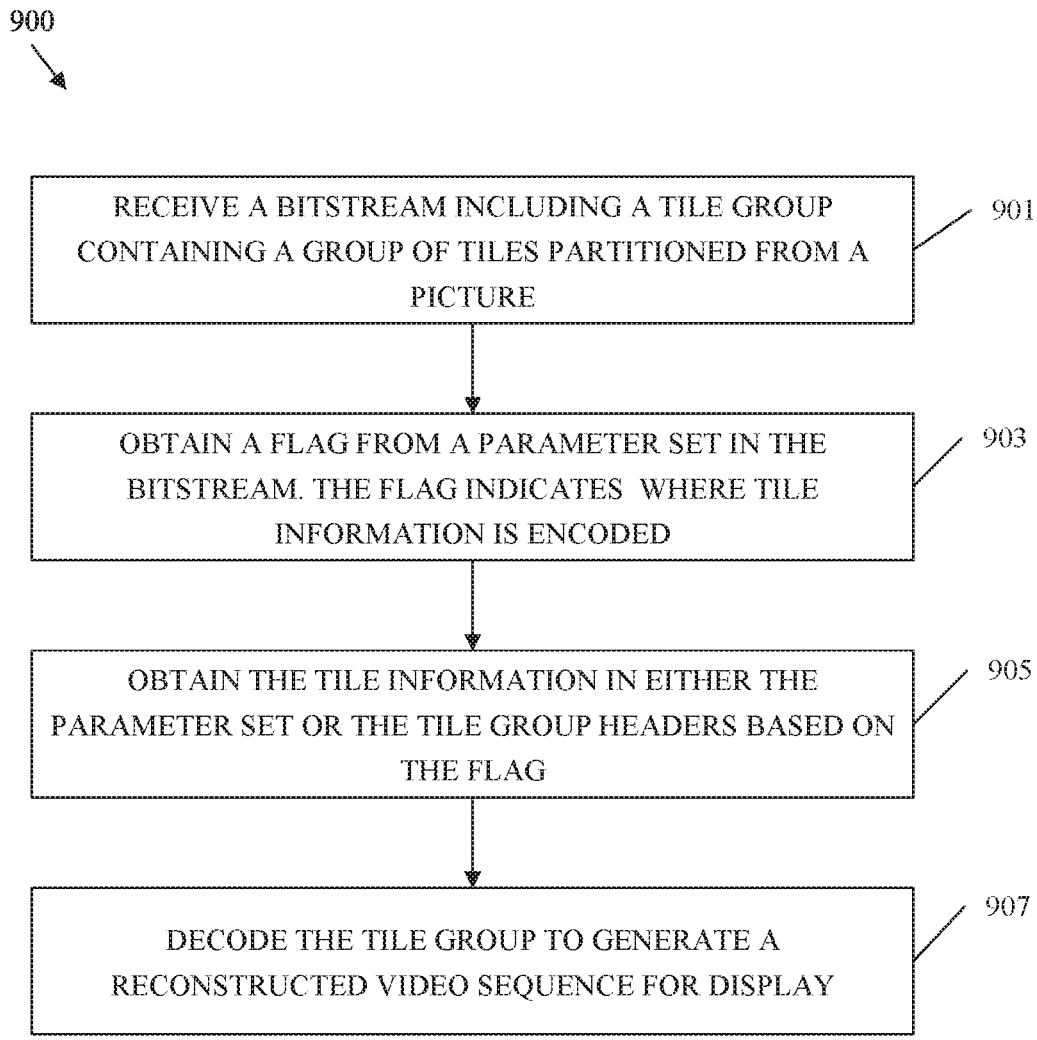
FIG. 9 is a flowchart of an example method of decoding an image with a flag indicating a location of tile group information from a bitstream.

FIG. 9 is a flowchart of an example method 900 of decoding an image, such as picture 601 from a bitstream, such as bitstream 500. Method 900 may be employed by a decoder, such as a codec system 200, a decoder 400, and/or a video coding device 700 when performing method 100.

Method 900 begins, at step 901, when a decoder begins receiving a bitstream of coded data representing a video sequence, for example as a result of method 800. For example, the coded data includes code data for at least one picture, where each picture includes at least one tile group.

At step 903, a flag is parsed from a parameter set in the bitstream. For example, the flag can be obtained from a PPS associated with the picture. The term parse or parsing, as used herein, can include the process of identifying or determining whether the flag or other syntax element is present in the parameter set, obtaining the value corresponding to the flag or other syntax element, and determining the condition associated with the value of the flag or other syntax element. In an embodiment, by parsing the flag, the method 900 can determine whether tile information for a coded picture is present in a parameter set or in tile group headers based on the flag.

At step 905, the method 900 obtains the tile information in either the parameter set or the tile group headers based on the flag. For example, when the flag specifies that the tile information for a coded picture is encoded in the parameter set, the method 900 can parse the tile information from the parameter set. Likewise, when the flag specifies that the tile information for a coded picture is encoded in the tile group headers, the method 900 can parse the tile information from the tile group headers.

At step 907, the tile group can be decoded to reconstruct a portion of the picture, which can then be included as part of a reconstructed video sequence. The resulting reconstructed video sequence can be forwarded to a display device for display to a user. The resulting reconstructed video sequence can also be temporarily or permanently stored in a memory or data storage unit of the decoder.

Figure 10:
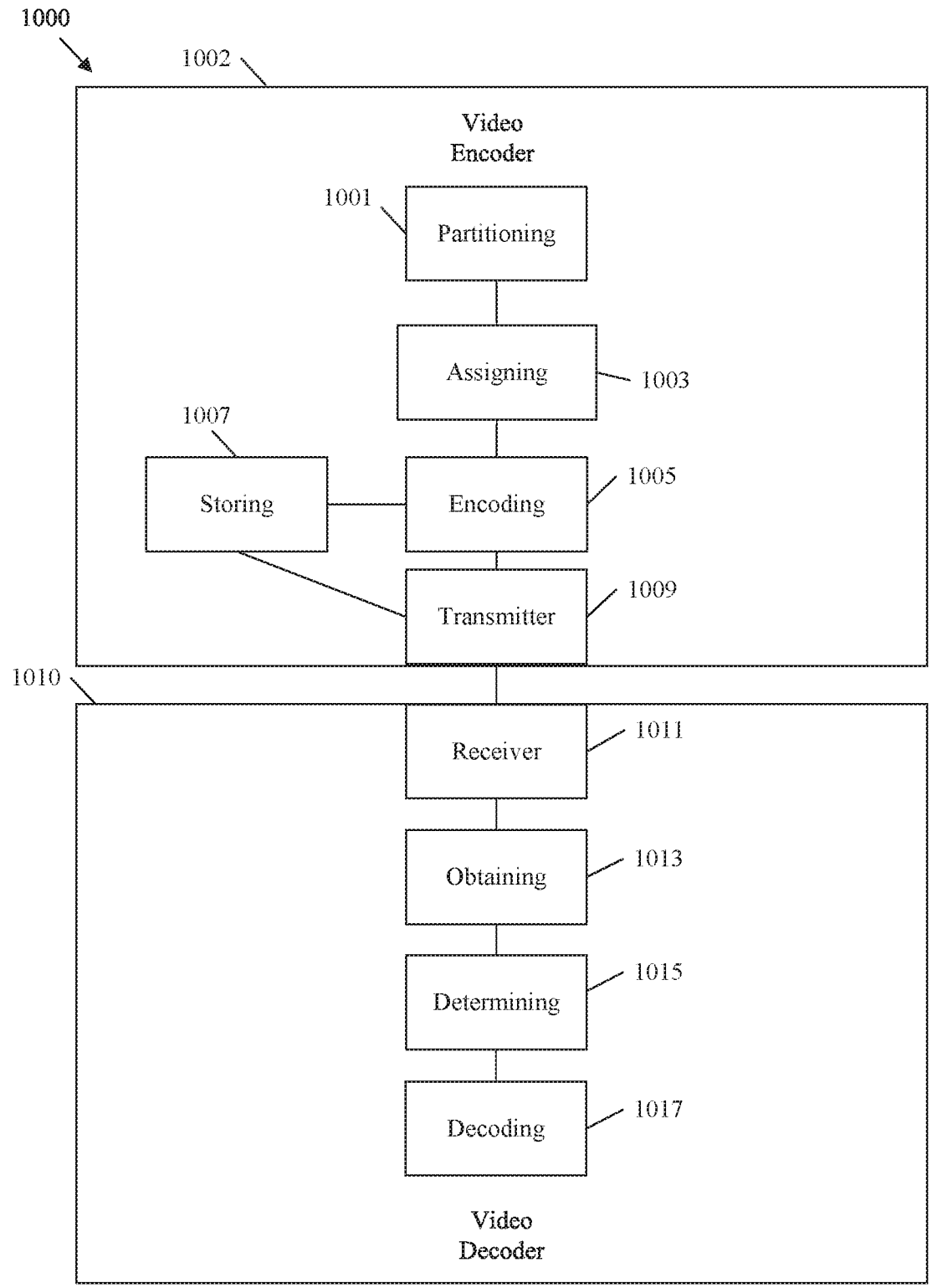
FIG. 10 is a schematic diagram of an example system for coding a video sequence of images in a bitstream.

FIG. 10 is a schematic diagram of an example system 1000 for coding a video sequence of images, such as picture 601, in a bitstream, such as bitstream 500. System 1000 may be implemented by an encoder and a decoder such as a codec system 200, an encoder 300, a decoder 400, and/or a video coding device 700. Further, system 1000 may be employed when implementing method 100, 800, and/or 900.

The system 1000 includes a video encoder 1002. The video encoder 1002 comprises a partitioning module 1001 for partitioning a first picture into a plurality of tiles. The video encoder 1002 further comprises an assigning module 1003 for assigning a group of the tiles into a tile group. The video encoder 1002 further comprises an encoding module 1005 for encoding the tile group into a bitstream and encoding a flag into a parameter set in the bitstream to indicate whether tile information for a coded picture is present in a parameter set or in tile group headers. The video encoder 1002 further comprises a storing module 1007 for storing the bitstream for communication toward a decoder. The video encoder 1002 further comprises a transmitting module 1009 for transmitting the bitstream to a decoder. The video encoder 1002 may be further configured to perform any of the steps of method 800.

The system 1000 also includes a video decoder 1010. The video decoder 1010 comprises a receiving module 1011 for receiving a bitstream including a tile group containing a group of tiles partitioned from a picture. The video decoder 1010 further comprises an obtaining module 1013 for obtaining a flag from a parameter set in the bitstream, wherein the flag indicates whether tile information for a coded picture is present in a parameter set or in tile group headers. The video decoder 1010 further comprises a determining module 1015 for determining whether certain conditions exist as they relate to the location of the tiling information. For example, the determining module 1015 can determine whether there is a single tile per tile group by parsing a single_tile_per_tile_group_flag. The video decoder 1010 further comprises a decoding module 1017 for decoding the tile group to generate a reconstructed video sequence for display. The video decoder 1010 may be further configured to perform any of the steps of method 900.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented in an encoder for encoding a video bitstream that comprises coded data for a plurality of pictures, each of the plurality of pictures comprises at least one slice, the method comprises:
 encoding a flag that indicates whether tile information for a picture is present in a picture parameter set or present in a slice header, wherein the tile information indicates a location of a slice within the picture;
 encoding the tile information in only the picture parameter set when the flag indicates that the tile information for the picture is encoded in the picture parameter set;
 encoding the tile information in only the slice header when the flag indicates that the tile information for the picture is encoded in the slice header; and
 encoding data of the picture in the video bitstream based on the tile information.

2. The method of claim 1, wherein encoding the tile information in the picture parameter set comprises encoding a tile identifier (ID) of a first tile of each slice in the picture.

3. The method of claim 2, wherein encoding the tile information in the picture parameter set further comprises:
 encoding a second flag that specifies whether a current slice that refers to the picture parameter set comprises more than one tile; and
 encoding the tile ID of a last tile of the current slice in the picture in response to a determination that the second flag specifies that the current slice that refers to the picture parameter set comprises more than one tile.

4. The method of claim 2, wherein encoding the tile information in the picture parameter set further comprises:
 encoding a second flag that specifies whether a current slice that refers to the picture parameter set comprises more than one tile; and
 encoding a number of tiles in the current slice in the picture in response to a determination that the second flag specifying that the current slice that refers to the picture parameter set comprises more than one tile.

5. The method of claim 1, wherein encoding the tile information in the slice header comprises:
- encoding a tile identifier (ID) of a first tile of a slice in the picture in the slice header;
- encoding a second flag that specifies whether a current slice that refers to the picture parameter set comprises more than one tile;
- determining whether the flag specifies that the tile information for the picture is encoded in the slice header and whether the second flag specifies that the current slice that refers to the picture parameter set comprises more than one tile; and
- encoding the tile ID of a last tile of the slice in the picture in the slice header in response to a determination that the flag specifies that the tile information for the picture is encoded in the slice header and that the second flag specifies that the current slice that refers to the picture parameter set comprises more than one tile.

6. The method of claim 1, further comprising transmitting the video bitstream along a network towards a decoder.

7. A method implemented in a decoder for decoding a video bitstream, wherein the video bitstream comprises coded data for a plurality of pictures, each of the plurality of pictures comprises at least one slice, the method comprises:
- parsing a flag that indicates whether tile information for a picture is present in a picture parameter set or present in a slice header, wherein the tile information indicates a location of a slice within the picture;
- parsing the tile information from the picture parameter set when the flag indicates that the tile information for the picture is encoded in the picture parameter set;
- parsing the tile information from the slice header when the flag indicates that the tile information for the picture is encoded in the slice header; and
- obtaining decoded data of the picture based on the tile information.

8. The method of claim 7, wherein parsing the tile information in the picture parameter set comprises decoding a tile identifier (ID) of a first tile of each slice in the picture.

9. The method of claim 8, wherein parsing the tile information in the picture parameter set further comprises:
- parsing a second flag that specifies whether a current slice that refers to the picture parameter set comprises more than one tile; and
- decoding the tile ID of a last tile of the current slice in the picture in response to a determination that the second flag specifies that the current slice that refers to the picture parameter set comprises more than one tile.

10. The method of claim 8, wherein parsing the tile information in the picture parameter set further comprises:
- parsing a second flag that specifies whether a current slice that refers to the picture parameter set comprises more than one tile; and
- decoding a number of tiles in the current slice in the picture in response to a determination that the second flag specifying that the current slice that refers to the picture parameter set comprises more than one tile.

11. The method of claim 7, wherein parsing the tile information in the slice header comprises:
- decoding a tile identifier (ID) of a first tile of a slice in the picture in the slice header;
- parsing a second flag that specifies whether a current slice that refers to the picture parameter set comprises more than one tile;
- determining whether the flag specifies that the tile information for the picture is encoded in the slice header and whether the second flag specifies that the current slice that refers to the picture parameter set comprises more than one tile; and
- decoding the tile ID of a last tile of the slice in the picture in the slice header in response to a determination that the flag specifies that the tile information for the picture is encoded in the slice header and that the second flag specifies that the current slice that refers to the picture parameter set comprises more than one tile.

12. The method according to claim 7, wherein parsing the flag that specifies whether the tile information for the picture is present in the picture parameter set or in the slice header comprises inferring that the flag specifies that the tile information for the picture is present in only the slice header in response to a determination that the flag is not present in the picture parameter set.

13. An encoder, comprising:
- a memory storing instructions; and
- one or more processors coupled to the memory, wherein the one or more processors are configured to execute the instructions to cause the encoder to:
  - encode a flag that indicates whether tile information for a picture is present in a picture parameter set or present in a slice header, wherein the picture comprises at least one slice, and wherein the tile information indicates a location of a slice within the picture;
  - encode the tile information in only the picture parameter set when the flag indicates that the tile information for the picture is encoded in the picture parameter set;
  - encode the tile information in only the slice header when the flag indicates that the tile information for the picture is encoded in the slice header; and
  - encode data of the picture in a video bitstream based on the tile information.

14. The encoder of claim 13, wherein the one or more processors are further configured to encode a tile identifier (ID) of a first tile of each slice in the picture.

15. The encoder of claim 14, wherein the one or more processors are further configured to:
- encode a second flag that specifies whether a current slice that refers to the picture parameter set comprises more than one tile; and
- encode the tile ID of a last tile of the current slice in the picture in response to a determination that the second flag specifies that the current slice that refers to the picture parameter set comprises more than one tile.

16. The encoder of claim 14, wherein the one or more processors are further configured to:
- encode a second flag that specifies whether a current slice that refers to the picture parameter set comprises more than one tile; and
- encode a number of tiles in the current slice in the picture in response to a determination that the second flag specifying that the current slice that refers to the picture parameter set comprises more than one tile.

17. A decoder, comprising:
- a memory storing instructions; and
- one or more processors coupled to the memory, wherein the one or more processors are configured to execute the instructions to cause the decoder to:
  - parse a flag that indicates whether tile information for a picture is present in a picture parameter set or present in a slice header, wherein the tile information indicates a location of a slice within the picture, and wherein the picture comprises at least one slice;

parse the tile information from the picture parameter set when the flag indicates that the tile information for the picture is encoded in the picture parameter set;

parse the tile information from the slice header when the flag indicates that the tile information for the picture is encoded in the slice header; and obtain decoded data of a coded picture based on the tile information.

18. The decoder of claim 17, wherein the one or more processors are further configured to parse the tile information in the picture parameter set comprises decoding a tile identifier (ID) of a first tile of each slice in the picture.

19. The decoder of claim 18, wherein the one or more processors are further configured to:

parse a second flag that specifies whether a current slice that refers to the picture parameter set comprises more than one tile; and decode the tile ID of a last tile of the current slice in the picture in response to a determination that the second flag specifies that the current slice that refers to the picture parameter set comprises more than one tile.

20. The decoder of claim 18, wherein the one or more processors are further configured to:

parse a second flag that specifies whether a current slice that refers to the picture parameter set comprises more than one tile; and decode a number of tiles in the current slice in the picture in response to a determination that the second flag specifying that the current slice that refers to the picture parameter set comprises more than one tile.

* * * * *